Feb. 19, 1957 L. C. MOODY 2,781,529
RETRACTABLE WHEEL ASSEMBLY FOR BOATS
Filed April 1, 1955 2 Sheets-Sheet 1
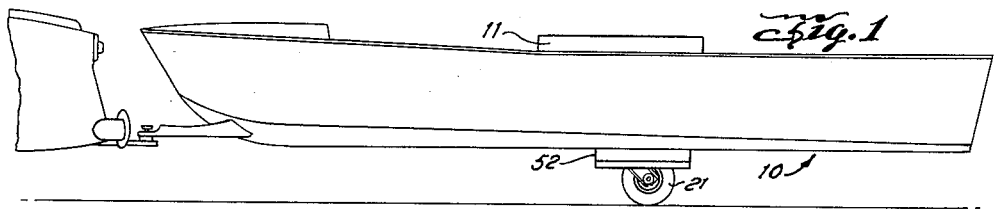
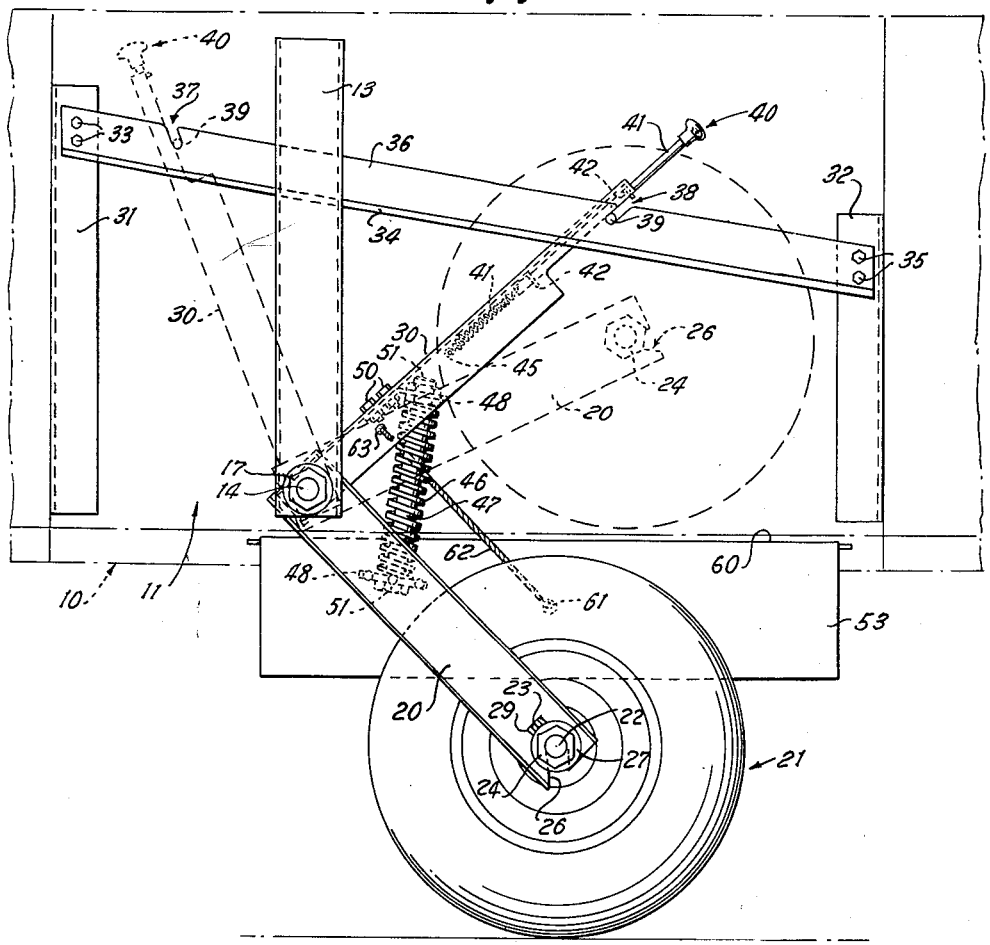
Lawrence C. Moody
INVENTOR
ATTORNEY

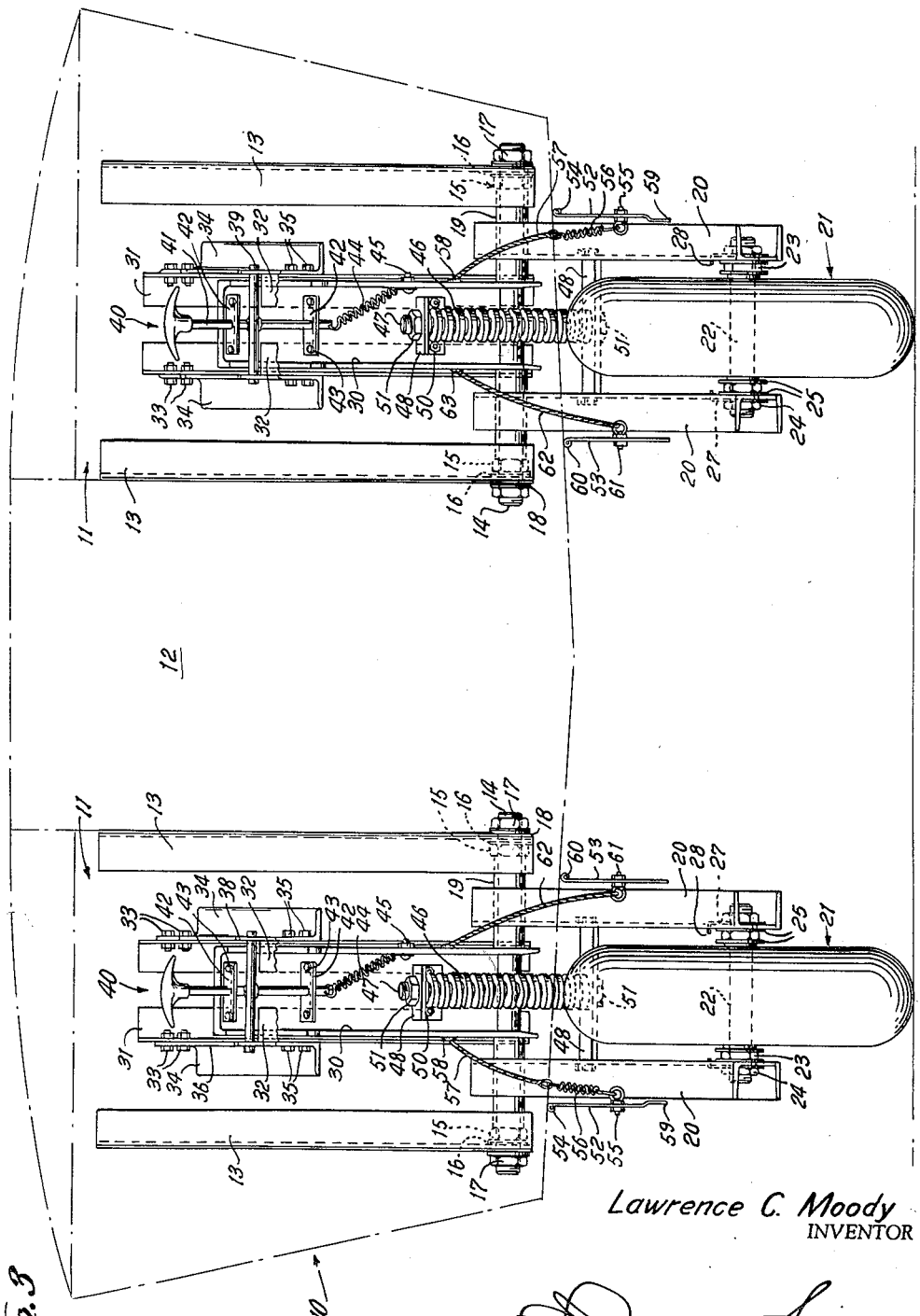

United States Patent Office 2,781,529
Patented Feb. 19, 1957

2,781,529

RETRACTABLE WHEEL ASSEMBLY FOR BOATS

Lawrence C. Moody, Dallas, Tex., assignor to Texas Longhorn Boat Manufacturing Co., Inc., a corporation of Texas Application April 1, 1955, Serial No. 498,500

10 Claims. (Cl. 9—1)

This invention relates to boats and more particularly to amphibious vehicles, made so by a retractable wheel assembly.

The principal object of the invention is to provide a retractable wheel assembly designed especially for small water craft which makes possible convenient transportation of the craft overland without the necessity of a trailer, thus avoiding the strenuous labor of loading and launching the boat.

Retractable wheels are not broadly new as applied to both air and water craft but known types of retractable wheels for boats are not so designed that the assemblies can be conveniently and quickly operated whether the boat is on land or in water. Moreover, retractable wheel assemblies, particularly those designed for aircraft, are usually operated hydraulically and as a consequence, must involve a hydraulic system which contributes to initial cost and expense of upkeep.

It is, therefore, another object of the invention to provide owners of small pleasure boats, fishing boats and the like with a means for transporting the boats overland without trailers, the said means comprising a pair of laterally spaced wheel carrying frames, each being pivoted for movement into and out of a chamber or pocket in the boat hull by a manually operable inboard lever lockable in both raised and lowered positions of the wheels, the said wheel chambers each having a pair of cooperating doors which automatically open and close as the wheel is moved to operative and inoperative positions, respectively.

Other objects will appear as the description proceeds when considered with the annexed drawing, wherein:

Figure 1 is an elevational view of a boat and fragmentarily showing a towing vehicle, the retractable wheel assembly being shown in operative position.

Figure 2 is a side elevational view of one of the wheel assemblies showing in solid and dotted lines the operative and inoperative positions, respectively, of these assemblies, and Figure 3 is a front elevational view of the two identical wheel assemblies and showing in dotted lines a boat to illustrate the relative positions of the assemblies therein.

Continuing with a more detailed description of the drawing, reference numeral 10 denotes generally a boat of any conventional design except for two longitudinally extending and laterally spaced wheel chambers or housings 11, the relative spacing of which compartments define a longitudinal passageway 12, as seen in Figure 3.

Inasmuch as the two wheel assemblies are identical in all respects, only one of the assemblies will be described but the same reference numerals will be employed to indicate corresponding parts in the companion assembly.

Accordingly, each wheel assembly includes a pair of confronting channel members 13 in vertical parallelism which are secured in any suitable fashion, as by bolting, to the inner wall surface of the chamber 11, one on each side thereof and disposed nearer one end of the chamber than the other, as shown in Figure 2. Journaled in the lower ends of the supporting members 13 are the ends of a transverse shaft 14 about which rotates the wheel frame to be described presently. The ends of the shaft 14 are each threaded and are passed through registering holes in the webs of the opposed channels 13. A nut 15 is threaded onto each end of the shaft 14 to bear against washers 16 which, in turn, bear against the inner surface of the webs of the channel members. In like manner, a nut 17 is threaded onto the outer end of the shaft and washers 18 are interposed between the nuts 17 and the outer surface of the channel member 13. In this manner, the shaft is held rigidly between the supporting channels 13.

Mounted for free rotation on the end portions of the shaft 14 is a pair of bushings 19, the outer ends of these bushings bear against the inner shaft retainer nuts 15. Affixed at one end to each bushing 19 is a channel member 20. These channel members constitute supporting arms for a wheel 21 and are arranged conversely for convenience in mounting the axle 22. As in the case of the shaft 14, the axle 22 is threaded at each end to receive inner retaining nuts 23 and outer retaining nuts 24. Washers 25 are disposed on the axle one on each side of the inner retaining nut 23.

The webs of the channels 20 are each provided with a slot 26 (Figure 2) whose long axis is perpendicular to the ground in lowered position of the wheel 21 so that the load will be imposed against the inner end of the slot. As a wheel safety lock, a washer 27 is secured under the nut 24 and has a lug 28 which extends outwardly from the washer and is turned at right angles to enter a slot 29 (Figure 2) in the web of the channel member or wheel supporting arm 20.

Mounted on the shaft 14 adjacent the inner end of each of the elongate bushings 19 is the lower end of a channel member 30 which will be referred to hereinafter as the wheel assembly actuating lever. The flanges of the channel member forming this lever are provided with matching holes receiving the shaft 14 on which the lever is free to rotate.

The lever 30 is disposed generally at right angles to the wheel supporting arms 20, hence the lever, in lowered position of the wheel, is disposed at the angle shown in solid lines in Figure 2 and in raised position of the wheel, the lever is positioned as shown in broken lines in this figure. In each position, the lever 30 is locked in the manner to be presently explained.

Secured to and in vertical parallelism with one end wall of the housing 11 is a pair of angle iron supports 31 and secured in like manner and disposition to the opposite wall of the housing 11 is a pair of similar but shorter angle iron supports 32. Secured at one end by bolts 33 to one of the tallest of the supports 31 adjacent their upper ends is one of a pair of confronting angle support members 34. The opposite end of each of the members 34 is secured by bolts 35 to one of the shortest supports 32 adjacent its top. The two members 34 are thus disposed in parallelism on an inclined plane as revealed in Figure 2.

The upstanding flanges 36 of the angle members 34 (Figure 2) are provided with a pair of slots 37 which are inclined forward and a second pair of slots 38 are inclined in the opposite direction. The matching slots 37 are adapted to receive a transverse locking bar 39 to sustain the wheel in raised position. This locking bar 39 is welded midway of its ends to a lock release or actuating handle 40 intermediate its ends. In lowered position of the wheel, the locking bar 39 is disposed in the matching slots 38 nearer the opposite ends of the angle members 34.

The lock release handle 40 is comprised of a rod 41 which is slidable longitudinally with respect to the lever 30 in aligned holes in spaced apart angle cleats 42, each of which extends from one to the other of the confronting flanges of the angle members of which the lever 30 is formed and are secured at their ends to these flanges by bolts 43 (Figure 3).

The lock release handle 40, the rod 41 and consequently the locking bar 39, being integral, are normally biased in the direction of the locking bar supporting rails 34, previously referred to as support members, by means of a coil tension spring 44, one end of which is attached to the lower end of the rod 41 while its opposite end is secured at 45 to one flange of one of the angle members of the lever 30. In this manner, the bar 39 will slide, under tension of the spring 44 along the top edge of the vertical flange 36 of the rails 34 and will be forced into one or the other of the matched slots 37—38, depending upon the position of the wheel, to secure the wheel against displacement from a selected position.

A shock absorber spring 46 surrounds a rod 47, one end of which extends through a hole in a cross-member 48 affixed between the wheel supporting arms 20 while its opposite end extends through a matching hole in a bracket 49, affixed by bolts 50 to the web of the channel member forming the lever 30. Thus, the shock absorbing spring 46 holds the lever 30 and wheel supporting arms yieldingly apart and when the lever 30 is locked in the slot 38 by the locking bar 39, the spring 46 assumes rod shocks imparted through the wheels 21. However, when the wheels are to be retracted by pulling the lever 30 forward the rod 47 assumes the weight of the wheels by virtue of the fact that it may move freely through the aligned holes of the cross-member 48 and the bracket 48 but such movement is limited by the nuts 51 threaded on each end of the rod and which come to bear on the bracket and cross member when the lever 30 is moved to raise the wheel assembly.

The bottom of each wheel pocket or housing 11 is closed by doors 52 and 53 when the wheels are retracted. The door 52 is hinged at 54 to the bottom of the boat 10 along one edge of the opening onto the wheel pocket 11. Secured by means of a bolt 55 (Figure 3) to the door 52 at its approximate midsection is one end of a coil spring 56. The opposite end of the spring 56 is affixed to one end of a wire cable 57 whose opposite end is secured, as by welding, to the lever 30 at 58. It will be observed that the outer edge of the door 52 has an inwardly offset portion 59.

The companion door 53 is hinged at 60 to the opposite edge of the opening in the bottom of the boat 10 and has attached to its approximate midsection, by means of a bolt 61, one end of a wire cable 62. The opposite end of the cable 62 is welded at 63 to the lever 30 opposite the point of securement thereto of the cable 57.

It is evident therefore that when the lever 30 is moved in a forward direction to raise the wheel 21, the doors 52 and 53 will follow the wheel upwardly as it moves into its housing or pocket 11. However, by virtue of the spring 56 of the cable 57, the door 52 will close first, followed by the door 53 which is raised by its cable 62 and the straight edge of the door 53 will come to rest in the recess formed by the offset bend in the edge of the door 52, thereby forming a flush joint.

Manifestly, the construction as shown and described is capable of some modification and such modification as may be construed to fall within the scope and meaning of the appended claims is also considered to be within the spirit and intent of the invention.

What is claimed is:

1. In a boat having a pair of longitudinal, laterally spaced wheel housings, a wheel assembly retractable into each of said housings, said wheel assemblies each comprising a supporting member vertically disposed on each side of a housing, a transverse shaft journaled at its ends in the lower ends of said vertical members, a pair of parallel wheel supporting arms connected at one end for rotation about said shaft, an axle supported between said pair of arms at the opposite end thereof, a wheel on said axle, a lever pivoted at one end to said shaft between said wheel supporting arms, a pair of inclined rails supported above and in transverse relation to said shaft and having longitudinally spaced slots therein, a lock release handle comprising a rod attached to and slidable longitudinally of said lever and having a locking bar affixed transversely thereto, said handle being effective to rotate said lever on said shaft, means biasing said locking bar against said rails for selective reception in said slots, and means yieldingly connecting said wheel supporting arms and said lever to raise and lower said arms and wheel in relation to said housing upon actuation of said handle.

2. A retractable wheel assembly for a boat having a wheel housing, a pair of opposed shaft supports, one on each side of said housing, a shaft journaled at its ends in the lower ends of said supports, a pair of wheel supports mounted for rotation about said shaft, a wheel rotatably supported between said wheel supports, a lever freely connected at one end to said shaft between said wheel supports, a rod connected between said wheel supports and said lever for limiting relative movement of said wheel supports and said lever in one direction, a shock coil spring embracing said rod and resisting movement of said wheel supports in another direction, a pair of inclined rails above and traversing said shaft and having longitudinally spaced pairs of matching slots therein, a lock release handle carried by said lever for actuating the same on said shaft to raise and lower said wheel supports in relation to said housing through said connecting rod, a transverse locking bar on said release handle and means for biasing said locking bar against said inclined rails to effect disposition thereof in a selected pair of said spaced pairs of slots.

3. In a boat having longitudinally extending, laterally spaced housings, a retractable wheel assembly in each of said housings, said wheel assemblies each comprising a vertical support mounted on each side of a housing, a shaft journaled at its ends in the lower ends of said supports, a pair of parallel wheel supporting arms attached at one end to said shaft and rotatable about its axis and supporting a wheel between their opposite ends, a lever pivoted at one end to said shaft between said wheel arms, a lock release handle mounted on said lever for axial movement in relation thereto, a transverse bar affixed to said handle, a pair of inclined rails supported longitudinally of said housing, one on each side of said lever, said rails having matching slots adjacent each end adapted to selectively receive the ends of said locking bar when said handle and lever are actuated, means biasing said locking bar against said inclined rails and means yieldingly connecting said wheel arms and said lever for common rotative movement on said shaft to actuate said wheel supporting arms when said lock release handle is actuated.

4. The structure of claim 3, wherein doors are hinged to opposite sides of said housing and flexible means connected between said doors and said wheel supporting arms to close said doors when said wheels are retracted into said housing.

5. The structure of claim 3, wherein said yieldingly connecting means is comprised of a bracket on said lever and a cross-member on said wheel supporting members having matching holes, a bolt having its ends extending freely through said matching holes, a nut on each end of said bolt and a coil spring embracing said bolt having its ends bearing against said bracket and cross-member.

6. In a boat having a wheel housing on each side thereof, each having a retractable wheel assembly therein, said wheel assemblies each comprising a shaft mounted transversely in a housing, a lever pivoted at one end to said shaft, a pair of wheel supporting arms pivoted at one end to said shaft, a wheel rotatably mounted between said arms, means connecting said lever and said wheel supporting arms for limited relative movement in one direction, a shock absorbing coil spring interposed between said lever and said wheel supporting arms and yieldingly resisting their relative movement in the opposite direction, a pair of inclined rails mounted above and traversing said shaft and having longitudinally spaced pairs of matching slots, a lock release handle for oscillating said lever on said shaft to raise and lower said wheel supporting arms in relation to said housing, a locking bar affixed between its ends to said lock release handle and means biasing said locking bar against said inclined rails for selective reception in said pairs of slots when said handle is actuated to secure said wheel assembly in raised and lowered positions.

7. The structure of claim 6, a door hinged to each side of said housing, a wire cable connected at one end to one of said doors and at its opposite end to one of said wheel arms, a second wire cable connected at one end to the other of said wheel supporting arms and a coil spring connecting the opposite end of said second wire cable to the other of said doors whereby one of said doors will close in overlapping relationship with the companion door.

8. The structure of claim 6, wherein each of said wheel supporting arms is slotted to receive the axle of said wheel and a washer embracing said axle having a lug disposed at right angles to the plane of said washer and entering a slot in one of said wheel supporting arms to insure against displacement of said wheel axle from the slots of said wheel supporting arms.

9. In a boat having a pair of longitudinal, laterally spaced wheel housings, a wheel assembly retractable into each of said housings, said wheel assemblies each comprising a supporting member vertically disposed on each side of one of said housings, a transverse shaft journaled at its ends in the lower ends of said vertical members, a pair of parallel wheel supporting arms connected at one end for rotation about said shaft, an axle supported between said pair of arms at the opposite end thereof, a wheel on said axle, a lever pivoted at one end to said shaft between said wheel supporting arms, a lock release handle attached to and slidable longitudinally of said lever, said handle being effective to rotate said lever on said shaft, means yieldingly connecting said wheel supporting arms and said lever to raise and lower said arms and wheel in relation to said housing upon actuation of said handle, and means locking said lever in each of two positions to secure said wheel assembly in operative and inoperative positions.

10. The structure of claim 9 wherein said locking means consists of a locking bar affixed transversely to said handle, a pair of parallel rails against which said rod is normally spring biased having means longitudinally spaced apart thereon for engaging said locking bar in each of two positions.

References Cited in the file of this patent

UNITED STATES PATENTS

| | | |
|---|---|---|
| 2,457,567 | Kuns | Dec. 28, 1948 |
| 2,501,750 | Warner | Mar. 28, 1950 |